*INVENTORS*
RALPH J. BAHNSEN
JOHN COCKE

Feb. 11, 1969 R. J. BAHNSEN ET AL 3,427,592

DATA PROCESSING SYSTEM

Original Filed Dec. 9, 1959 Sheet 2 of 4

United States Patent Office 3,427,592
Patented Feb. 11, 1969

3,427,592
DATA PROCESSING SYSTEM

Ralph J. Bahnsen, Brighton, Mass., and John Cocke, Mount Kisco, N.Y., assignors to International Business Machines Corporation, New York, N.Y., a corporation of New York Continuation of application Ser. No. 858,520, Dec. 9, 1959. This application Nov. 12, 1964, Ser. No. 410,690
U.S. Cl. 340—172.5 30 Claims
Int. Cl. G11b *13/00*

This application represents a continuation of a copending application, Ser. No. 858,520, filed on Dec. 9, 1959.

This invention relates generally to a data processing system and more particularly to reducing access time in the instruction indexing portion of a data processing system.

It is well known in the prior art to provide data processing systems with both a main or permanent memory and a quick-access or temporary store. Under the control of a programmer, data is transferred from the permanent memory to the quick-access store prior to use in the processing system. It is the principal object of this invention to avoid the transfer of data from the permanent memory to the quick-access store every time a program instruction calls for such data. This result is accomplished by storing selected data in high speed buffer registers so that the data may be read out directly from the buffer without first addressing the permanent memory.

It is another object of this invention to load index values or words automatically from a permanent memory into a plurality of high speed buffers.

A further object is to select an index value from a storage means at a location specified by an index address in the instruction and to utilize this value to index the instruction.

It is a more specific object to compare the index address of an instruction with each of the index memory addresses associated with the individual buffers in such a manner that, if a buffer address is the same as the index address of the instruction, an index word or value associated with that address in the buffer is utilized for indexing the instruction. If the addresses are not the same, the least recently acquired index word stored in the buffer is replaced by a new index word from the main memory.

A data processing system incorporating this invention will now be described briefly with a more detailed description to follow below.

An instruction is provided by a programming device such as a program register. This instruction comprises three portions: (1) An operational code or op. code; (2) an operand address (OA); (3) an index address (IA) or I field of the instruction. Each buffer has stored therein: (1) An index word or value; (2) an index memory or "wherefrom" address, that is the address of the location in a main memory from which the index word was transferred; (3) a J bit for indicating the particular buffer which contains the least recently acquired index word, into which buffer a new index word may be stored if the I field of an instruction does not match or compare with any of the index addresses stored in the buffers; and (4) an $\overline{S}$ bit for indicating whether its associated index word in the buffer is different from the index word in main memory at the address corresponding to the index memory address in the buffer. The status of each index word in the buffer is therefore indicated by the condition of its associated J and $\overline{S}$ bits.

The main or permanent memory mentioned above has slow access time and has stored therein, at a plurality of addressable locations, information bits arranged as data words which may be used either as index words or as operands. In the discussion to follow, the terms "address" or "memory address," will generally be used for the numerical designation of a location in memory. However, in some instances, the terms will be used to designate the location itself. Data words are not destroyed but remain in main memory by regeneration or otherwise when they are transferred to the buffer registers.

The principal feature of this invention resides in the provision of a means for automatically transferring index words or other data from a main memory to selected high speed buffer registers in such a manner that the most frequently used index words are always stored in the buffers. With this arrangement, when the index address specified by the program instruction does not match an address of one of the index words already stored in the high speed buffers, the least recently acquired index word (i.e., the index word which was first used the longest time ago) is replaced by a new index word located in the main memory at the address specified by the index address of the instruction. The replaced index word, if different from the present index word stored in the main memory at the replaced word's associated memory address, is then returned to, and stored in, the main memory at that address. Otherwise, it is merely erased from the buffer since the main memory had previously retained this index word when it was first transferred to the buffer. In other words, replacement of an index word in the buffer, and rewriting of the word into main memory, are performed in response to the previous history of the word in the system.

Other objects of the invention will be pointed out in the following description and claims and illustrated in the accompanying drawings which disclose, by way of example, the principle of the invention and the best mode which has been contemplated of applying that principle.

Figure 1:
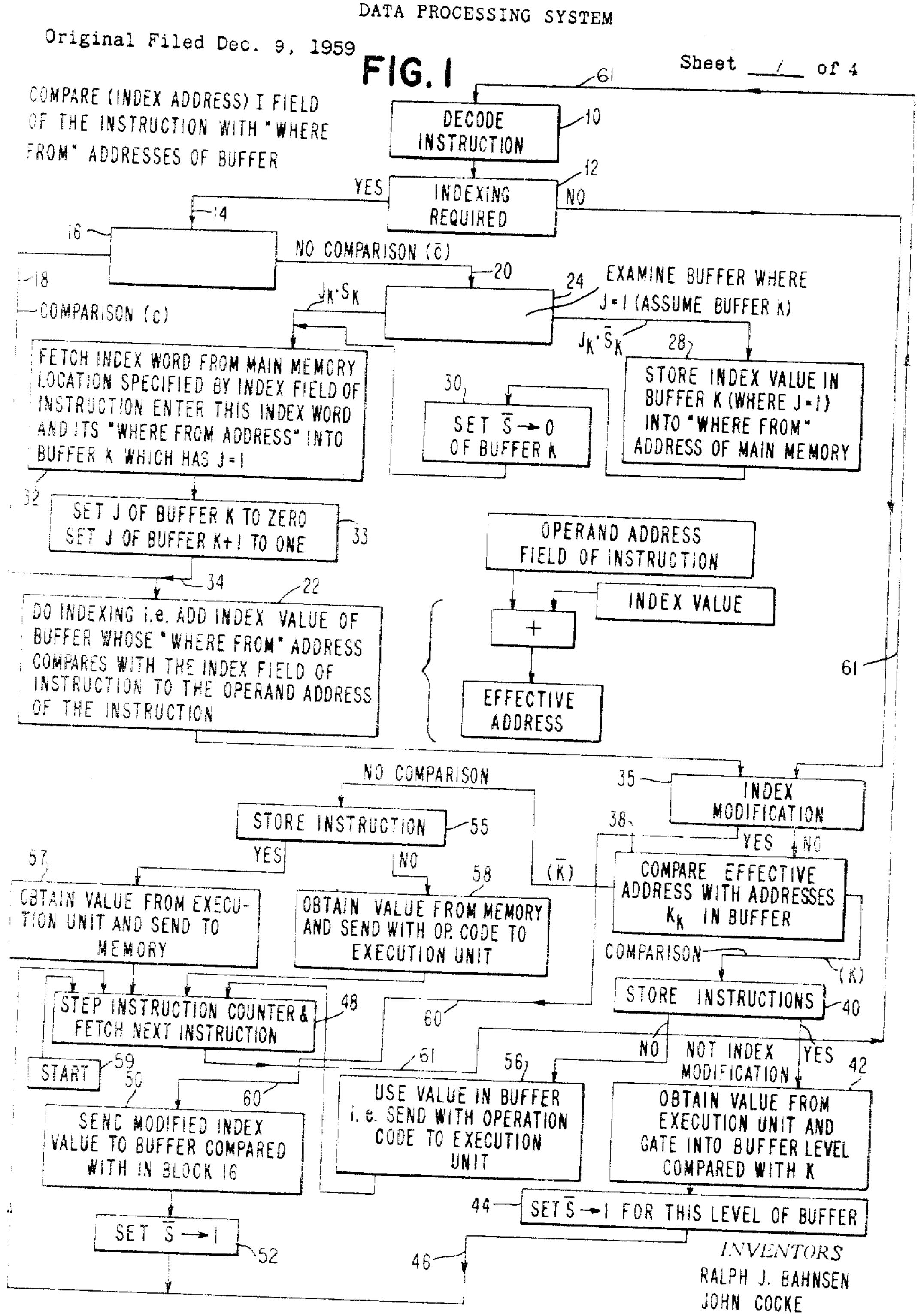
FIG. 1 is a block diagram illustrating the program steps involved in this data processing system.

A detailed description of the manner in which the above objects are accomplished by this invention will now be presented with reference to the block diagram illustrated in FIG. 1. This diagram shows the programming steps involved in this data processing system. An instruction is applied via a line 61 to a conventional decoder 10. As previously discussed, this instruction contains an op code, an operand address and an I field or index address. The decoded instruction is then applied to the block indexing required 12 which has a "Yes" and "No" output depending upon whether or not indexing of this instruction is required. Whether or not indexing is required is determined by the index address of the instruction, and in certain instances, by the op code. When indexing is required, the instruction is fed along the path 14 to logical block 16.

In logical block 16, the index address of the instruction is compared with the index memory or "wherefrom" addresses of the index values or words stored in a buffer register. Each "wherefrom" address identifies the location or address in a main memory containing the index value originally associated with this address. If an index value has been modified while stored in the buffer, the modified value may replace the original value in the main memory at this address. If a comparison (C) occurs, the instruction is fed along path 18, and if no comparison occurs, the instruction is fed along path 20.

When a comparison occurs, the instruction is applied via the path 18 to a block 22 where the actual indexing of the instruction takes place. In this indexing operation the operand address of the instruction is added to the index value whose index memory or "wherefrom" address in the buffer compared with the index address or I field of the instruction.

If no comparison ($\overline{C}$) occurs in block 16 between the two addresses, block 24 causes the buffer whose J bit is set to "1" to be examined. As pointed out previously, the J bit determines which buffer contains the least recently acquired index value. The value having a J bit set to "1" is the least recently acquired.

The output of block 24 may take one of two paths dependent upon whether the $\overline{S}$ bit of the particular buffer having $J=1$ is set to "1" or "0." An $\overline{S}$ bit is said to be "on" when it has a value of "1" and is designated by $\overline{S}=1$ or $S=0$. In the logical circuit discussed below, the $\overline{S}$ bit is used such that when the $\overline{S}$ bit is "on" ($\overline{S}=1$), it indicates that the index value now in that buffer (assume buffer $k$) is different from the index value stored in the main memory at the address from which buffer $k$ was originally filled. When such a condition occurs, block 28 causes the modified index word of buffer $k$ to be stored in the main memory at the location or address specified by its own index memory address, thus replacing the original index word stored at that address. Block 30 then causes the $\overline{S}$ bit of buffer $k$ to be set to a zero ($\overline{S}=0$) indicating the words in buffer $k$ and in the main memory are now the same. After this has been accomplished, block 32 causes the index word specified by the index address of the instruction to be entered (along with its index memory address) into buffer $k$ which has a J bit set to "1," i.e., buffer $k$ had been holding the least recently acquired index word, and its $\overline{S}$ bit is now also set to "0." Block 33 now functions. The J bit of buffer $k$ is then set to "0" indicating that this buffer no longer contains the least recently acquired index word and the J bit of the next buffer (buffer $k+1$) is set to "1" indicating that it now contains the least recently acquired index word. This new index word from buffer $k$ is then applied along path 34 to block 22 where indexing of the instruction is performed by adding this new index word to the operand address of the instruction to obtain a new or effective operand address as previously described with respect to the "comparison" output of block 16.

If the $\overline{S}$ bit of the buffer having $J=1$ is already set to "0," the word stored in buffer $k$ is already the same as the word stored in main memory at the "wherefrom" address, so that it is not necessary to transfer the index word from the buffer to main memory. Blocks 28 and 30 are by-passed and block 32 functions immediately.

From this previous description, it can be seen that an index word stored in a buffer and having an associated "wherefrom" address corresponding to that specified in the instruction is immediately read out of the buffer and applied to the index block or adder 22, whereas when an index address of the instruction does not compare with an index address stored in the buffer, the index word at the main memory address specified by the index address of the instruction is transferred from the main memory and stored in the buffer containing the least recently acquired index word which in turn may be returned to main memory at a location corresponding to its "wherefrom" address.

The function of logical block 22 is to index the instruction. This indexing operation involves the addition of the operand address of the instruction and the index value obtained from either path 18 or path 34. This indexing operation is shown schematically at the right of block 22. The sum of the operand address and the selected index value is the new operand address and is termed the effective address.

The above discussion covers the principal feature of this invention, i.e., comparing the index address of an instruction with the index addresses of a buffer so that, when a match occurs, the corresponding index value is read out of the buffer and is used to index the instruction or perform some other function, and when no match occurs, causing an index value and address from the main memory to replace the index value and address which had been least recently stored in the buffer. This automatic transfer of index values is accomplished by a system of timing pulse generators and logical gating circuits as described below in terms of the block diagram of FIG. 1.

The output of the indexing block 22 and also the "no" output of block 12 are inserted into the block 35 which determines whether an index modification is to occur. If the answer is no, the effective address is compared with the buffer index memory addresses in block 38. If there is a comparison (K), block 40 determines whether or not the op code of the instruction calls for a store operation other than index modification, i.e., whether it requires that the index value in the selected buffer be replaced. If such a store operation is required, then logical block 42 obtains from an execution unit a value which may have been computed previously, and gates it into the buffer with which the comparison (K) occurs so as to replace the index value therein. Therefore, this buffer no longer contains the same index word as is stored in main memory at its "wherefrom" address and logical block 44 sets the $\overline{S}$ bit for this buffer to "1." After this step, a signal is applied along the line 46 to the logical block 48 whose operation will be explained later.

If logical block 40 determines that the instruction is not one requiring a store operation, i.e., a change of index value in the buffer, logical block 56 takes over and sends the index value in the buffer compared within block 38 along with the op code to the execution unit. In this case, then, the index value is treated as an operand. After this operation, a signal is applied to logical block 48.

If no comparison ($\overline{K}$) occurs in logical block 38, then logical block 55 determines whether the instruction calls for a store. If it does not, block 58 fetches an operand from the main memory at the effective address and sends it along with the op code to the execution unit. Block 58 also sends a signal to block 48. If a store operation is called for, block 57 obtains a word from the execution unit and sends it to main memory at the effective address. Block 57 then applies a signal to block 48.

If logical block 40 determines that the instruction is take place, it acts via a line 60 to cause logical block 50 to perform the next step. Block 50 functions to store the modified index value generated in block 22 into the buffer with which the first comparison occurred in block 16. Block 52 then sets the $\overline{S}$ bit of this buffer to "1" and a signal is then applied along line 46 to block 48.

Note that block 48 may be called into operation by signals applied from blocks 44, 52, 56, 57 or 58. Logical block 48 serves to step an instruction counter (assuming a single address system), and fetch the next instruction word from main memory. This new instruction is then applied along line 61 to be decoded in decoder 10 after which the above-described indexing operations may be repeated. Block 59 symbolizes means for applying a start pulse to the instruction counter in order to initiate operation of the system. After the application of a start pulse, the system operates automatically.

Figure 2:
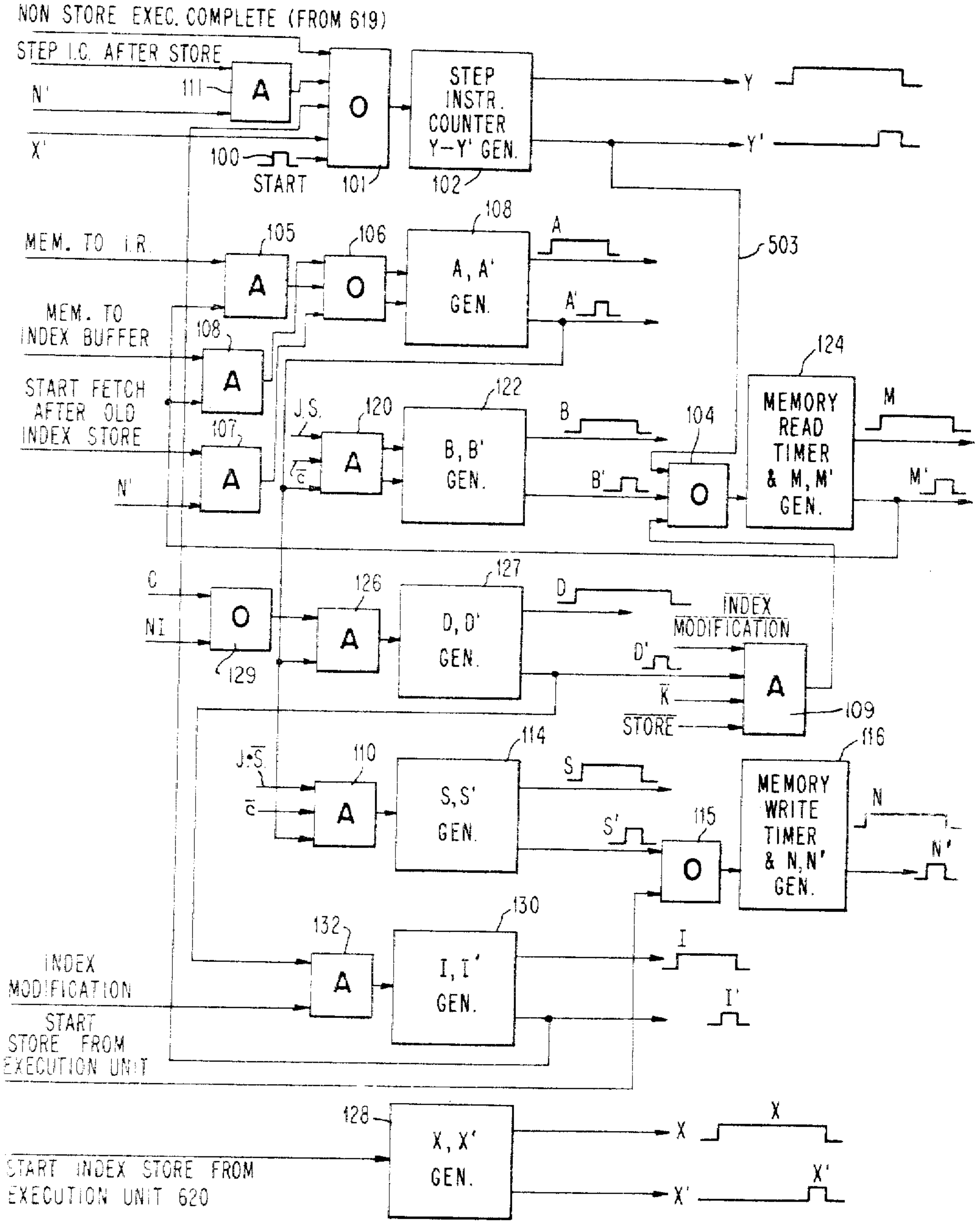
FIG. 2 shows the pulse generators and associated control circuits for producing the timing pulses used in this system.

FIG. 2 shows the timing pulses generated for each of the four possible cases which may arise involving the instruction indexing system of the present invention. Also shown are the pulse generators and associated control circuits for producing these timing pulses.

For Case 1, let us assume there is no comparison between the index address of the instruction and the index addresses in the high speed buffers, and in addition, the bit J trigger for buffer $k$ is "on" ($J_k=1$) and the $\overline{S}$ bit trigger is also "on" ($\overline{S}_k=1$). That is, buffer $k$ contains the least recently acquired index value and its associated address, and the value at this address in the main memory is not the same as the value in buffer $k$ since this latter value has been changed while stored in the buffer. In accordance with the program step represented by logical block 28 of FIG. 1, the index value or word in buffer $k$ is stored in the main memory, thus replacing the original value, and the $\overline{S}_k$ is turned "off" ($\overline{S}_k=0$ or $S_k=1$). As shown in FIG. 2, A, A', S, S', N and N' timing pulses are generated for controlling this particular operation. After the $\overline{S}$ bit is set to zero, the procedure for Case 2 is then followed.

In Case 2 there is also no comparison between the index address of the instruction and the index memory or "wherefrom" address of buffer $k$, and $J_k$ also equal one, but $\overline{S}_k$ is already set to zero. That is, the index value stored in the main memory at the "wherefrom" address is the same as that stored in buffer $k$. As indicated by logical block 32 in FIG. 1, the new index word or value specified by the index address of the instruction is read out of memory and stored in buffer $k$, thus replacing the index value previously held there. At the same time, the J bit of the $(k+1)$th buffer is set to one, since this buffer now contains the least recently acquired index value. For performing the operations required in Case 2, A, A', B, B', M and M' timing pulses are generated in the sequence as shown. It should be remembered that in this Case 2, there is no need to store the index value from buffer $k$ back in main memory since the buffer and main memory already hold the same index value.

In Case 3 there is a comparison between the instruction index address and index memory address in buffer $k$. Therefore, the corresponding index word or value in buffer $k$ is fed to an adder for indexing the instruction as indicated by logical block 22 in FIG. 1. A, A', D, and D' timing pulses are generated to perform these functions.

Case 4 involves a specific store instruction which calls for an indexing modification operation, i.e., modification of one of the values or words in the buffers. In this case, timing pulses I and I' are generated in addition to A, A', D and D'.

Figure 3:
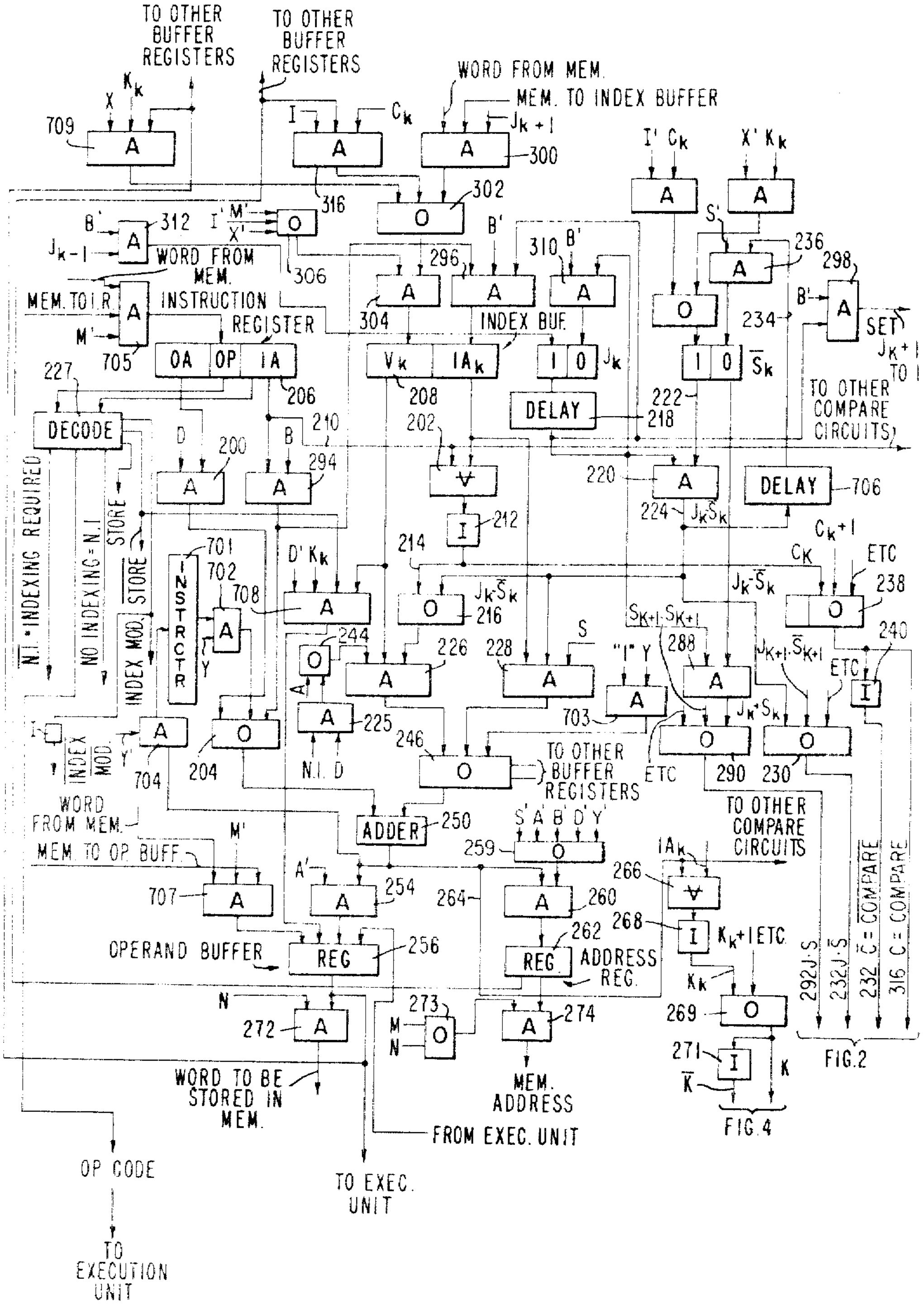
FIG. 3 illustrates a logical circuit diagram utilizing the timing pulses of FIG. 2 for accomplishing the steps of FIG. 1.

FIG. 3 illustrates a logical circuit for gating information to and from buffer $k$, together with comparing circuits associated with an instruction register and other elements. Conventional logical circuit symbols are used in FIG. 3, for example, a logical AND gate 200, EXCLUSIVE OR gate 202 and an OR gate 204. An instruction register 206 provides an instruction including an operand address OA, an operational code OP and index address IA. The $k$th buffer register 208 contains an index value or word $V_k$, index memory or "wherefrom" address $IA_k$, a $J_k$ bit and a $\overline{S}_k$ bit.

Each input and output line from the OA, OP, IA sections of instruction register 206, and the $V_k$, $IA_k$ sections of buffer register $k$, is symbolic and actually represents a plurality of lines, one for each binary bit contained in the section. Therefore, there is parallel read-in and read-out of information. Furthermore, the logical gates with which these symbolic lines are associated, also actually represent a plurality of gates, one for each bit. Likewise throughout the system wherever there is a transfer of information, the logical gates handling such transfer must be duplicated in order to provide one gate for each binary bit of the number. The system may also be constructed by one skilled in the art using serial logic.

We will no consider in detail each of the four cases just described. It will be necessary to refer to both FIGS. 2 and 3 during these descriptions.

Let us first follow through Case 1 where there is no comparison between the index address of the instruction and the index memory addresses in any of the buffer registers, and the $k$ buffer register 208 contains the least recently acquired index value. In addition, buffer $k$ contains an index value which is different from the value located at the same address in a main memory, such as a magnetic core memory (not shown). Therefore, the $J_k$ bit equals 1 and the $\overline{S}_k$ bit equals 1.

As shown in FIG. 3, the instruction address IA from the instruction register 206 is applied along the line 210 to a set of EXCLUSIVE OR gates 202 (diagrammatically represented by a single gate) associated with buffer $k$ and also to a plurality of sets of other EXCLUSIVE OR gates (not shown) associated with corresponding buffer registers $k+1$, $k+2$, etc. (not shown). The index memory address or $IA_k$ of buffer $k$ is also applied to EXCLUSIVE OR gates 202 which operate in such a manner that when IA and $IA_k$ are not equal, there is an output signal from one or more of gates 202. However, all of the outputs of gates 202 are fed to an inverter 212 which functions to provide no output signal when a signal from any of gates 202 is applied to its input. Therefore, in Case 1, there is no signal applied to the input lead 214 of OR gate 216 or the the $C_k$ input of OR gate 238 since inverter 212 is down. Furthermore, in Case 1, there would also be no signals on leads $C_{k+1}$, $C_{k+2}$, etc., to OR gate 238, since each of the inverters (not shown) associated with each of the other buffers $k+1$, $k+2$, etc., would have no output due to the lack of any comparisons with the IA value of the instruction.

However, since the $J_k$ bit of buffer 208 equals 1 (the J bits of all other buffers equal 0), a signal is applied through a delay unit 218 to one of the input leads of AND gate 220. In addition, since the $\overline{S}_k$ bit is also equal to 1, there is an output signal applied to line 222 and to the other input of AND gate 220. Because both inputs of AND gate 220 are up simultaneously, there is an output signal applied to line 224. This output signal may be designated $J_k \cdot \overline{S}_k$ and is applied to several lines.

We will now consider the several paths available to the signal $J_k \cdot \overline{S}_k$. This signal is passed through OR gate 216 and applied as one of the three inputs to a set of AND gates 226 (diagrammatically represented by a single gate) associated with the $V_k$ section of the $k$ index buffer. $J_k \cdot \overline{S}_k$ is also applied as one of the inputs to a set of AND gates 228 (diagrammatically represented by a single gate) associated with the $IA_k$ section of the $k$ index buffer. This signal is also applied to the OR gate 230 which has one input corresponding to the $J_k \cdot \overline{S}_k$ output from each of the index buffers. Any input to OR gate 230 will provide an output signal designated as $J \cdot \overline{S}$ which appears on output lead 232. $J_k \cdot \overline{S}_k$ is also applied to line 234 as one input to the AND gate 236, after passing through delay 706.

As previously mentioned, for Case 1, there is no output signal from any inverter 212 and, therefore, there is no output signal C from OR gate 238. However, since inverter 240 operates to provide an output signal when there is no signal applied to its input, there is a signal $\overline{C}$ produced on output lead 242.

Figure 4:
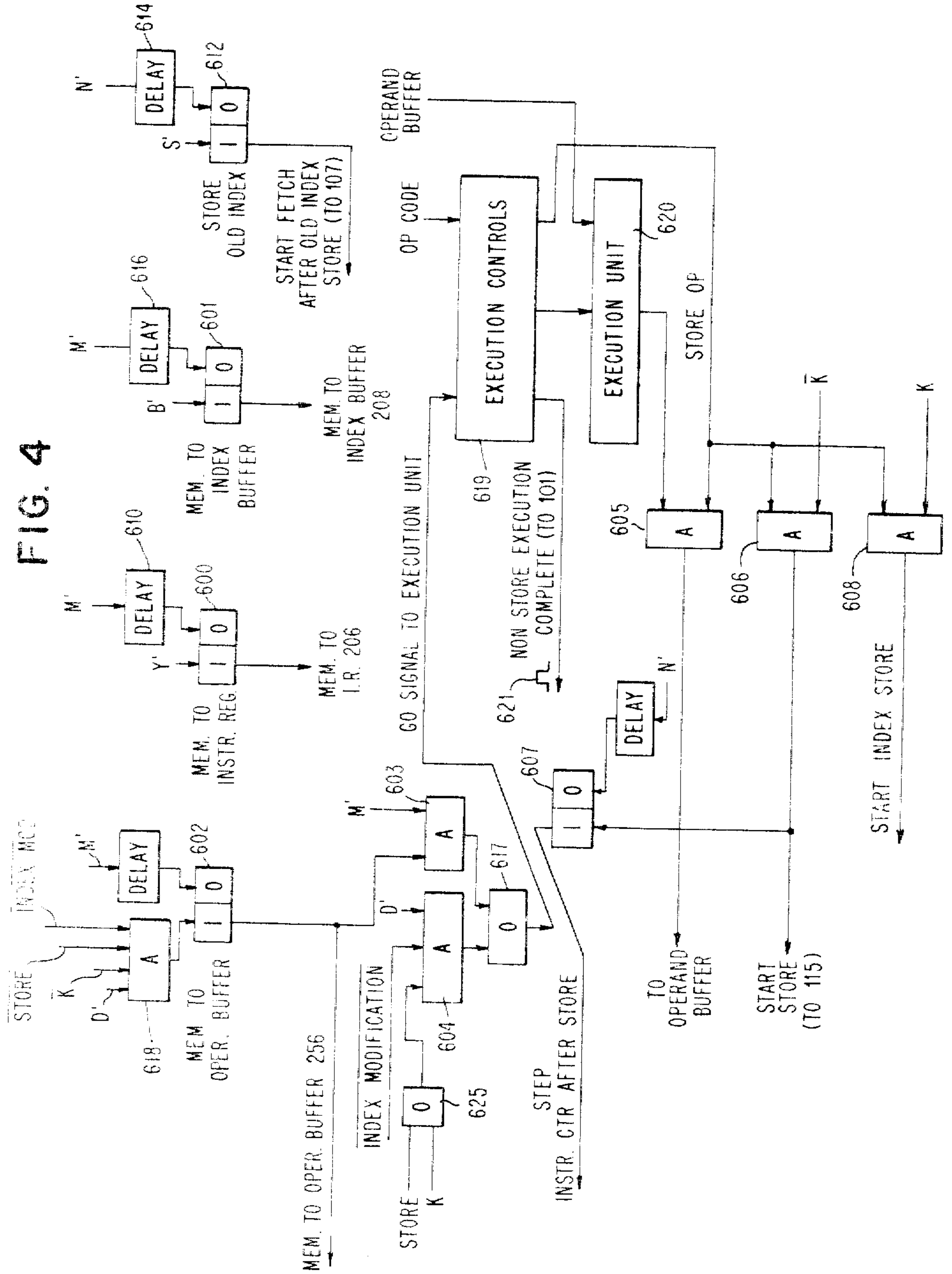
FIG. 4 shows additional logical circuits used in this system.

We will now turn more specifically to FIGS. 2 and 4 and the timing pulse generator control circuits and logical gating circuits shown there. The sequence of operations is started by applying a start pulse 100 to OR gate 101. (When first starting, the instruction counter may be reset to some convenient number.) This pulse triggers a pulse generator 102 which provides pulses Y and Y'. Now referring to FIG. 3, the Y pulse opens a set of AND gates represented diagrammatically by a single AND gate 702. This gate permits the number in the instruction counter 701 to enter the left input to the adder 250 by way of a set of OR gates 204. The Y pulse is also applied to AND gate 703 whose other input is always up. The output of AND gate 703 is applied to the OR gate of the lowest order bit position of the set of OR gates indicated in FIGURE 3 by the single OR gate 246. The output of OR gate 246 thus supplies a 1 to the lowest order bit of the contents of adder 250. The Y pulse thus accomplishes the addition of 1 to the contents of the instruction counter 701. The output of adder 250 is gated into address register 262 by a Y′ pulse applied via an OR gate 259 to a set of AND gates 260. Y′ also gates the adder output into the instruction counter 701 through a set of AND gates 704. It is assumed that there is enough delay through the logic that the altering of the instruction counter contents by the Y′ pulse will not influence the output of the adder until the Y′ pulse has fallen. If this is not the case, delay may be inserted to insure proper operation.

We are now left with 1+ the initial instruction counter value residing in the address register 262 and also in the instruction counter 701. From FIGURE 2 we see that the Y′ pulse is applied along line 503 to OR gate 104. The output of OR gate 104 triggers the memory read timer pulse generator 124 which supplies pulses M and M′. The Y′ pulse also sets trigger 600 (FIG. 4) to 1. This trigger remembers that a fetch of an instruction from memory has been started and its output must be up to transfer an instruction to instruction register 206.

Referring to FIGURE 3 again, we see that the M pulse is applied to OR gate 273. The output of OR 273 opens AND gates 274, thereby allowing the contents of register 262 to be sent to the memory addressing circuits. Thus the initial instruction counter value +1 will be the address used by the memory during the read-out. The M pulse also times out the memory read cycle. At the end of the read cycle the M′ pulse is applied to the set of AND gates illustrated by AND gate 705. Another input (MEM to I.R.) to this set of AND gates comes from trigger 600 (FIG. 4) which was turned "on" by the Y′ pulse. The third input (WORD FROM MEM) to the set of AND gates 705 is the data which was read from memory. Thus, the M′ pulse gates the output of the memory into the instruction register 206, so that the instruction is now in instruction register 206.

In FIGURE 2, the M′ pulse applied to AND gate 105 with the output of trigger 600 (memory to instruction register) energizes OR gate 106 which triggers pulse generator 108 which in turn supplies A and A′ timing pulses. The M′ pulse (FIG. 4), delayed by a conventional pulse delay unit 610, turns off trigger 600 in FIG. 4.

In Case 1 there is no comparison between the IA field of register 206 and the IA's of the buffers. The output of inverter 240 is, therefore, up to provide a non-comparison signal $\overline{C}$. The A pulse applied via an OR gate 244 to the set of AND gates 226 along with the $J_k \cdot \overline{S}_k$ output of AND gate 220 (via OR gate 216) allows the value $V_k$ to reach OR gates 246. The output of OR gates 246 enters the right side of adder 250 (the left side of the adder has zero input). The output of the adder is sampled into register 256 by the A′ pulse applied to the set of AND gates 254. The only other meaningful function performed by the A and A′ pulse at this time is the triggering of the S, S′ pulse generator 114 (FIG. 2). This is accomplished by the coincidence of $\overline{C}$ from inverter 240, $J \cdot \overline{S}$ from OR gate 230, and A′ at AND gate 110.

The S pulse is applied to the set of AND gates 228 with $J_k \cdot \overline{S}_k$ from AND gate 220 and the $IA_k$ field of buffer register 208 to allow the wherefrom or index memory address of buffer *k* to reach the set of OR gates 246. The output of OR gate 246 enters the right side of the adder 250. The left side of the adder has zero as its input. The S′ pulse applied via OR gate 259 to AND gates 260 gates the $IA_k$ field into address register 262. The S′ pulse entering OR gate 115 of FIG. 2 also triggers the memory write timer 116 which supplies N and N′ timing pulses. The S′ pulse turns on trigger 612 (see figure 4) which remembers that we are transferring an old index value from the buffer into memory to make room for a new index value. The S′ pulse also turns off the $\overline{S}_k$ trigger by means of AND gate 236. The other input to AND gate 236 is the $J_k \cdot \overline{S}_k$ output of AND gate 220 applied along line 234. The delay 706 is shown to illustrate a means of avoiding any race condition that might exist.

The N pulse applied to the set of AND gates 272 allows the word in the operand buffer register 256 to go to memory for storing. The address into which this word is to be stored is supplied to the memory by AND gates 274 which are fed from OR gate 273 which in turn is energized by the N pulse.

At the end of the memory write cycle determined by timing pulse N, the N′ pulse is applied to AND gate 107 of FIGURE 2. The other input START FETCH AFTER OLD INDEX STORE to AND gate 107 comes from trigger 612 of FIGURE 4. Since trigger 612 is "on," AND gate 107 triggers the A, A′ pulse generator 108 through OR gate 106. The N′ pulse applied through delay unit 614 also turns off trigger 612.

We have now reached the point where we have stored the buffer value whose J bit was set to 1 into its "wherefrom" address in memory. We have also set the $\overline{S}$ bit to 0. This means we are now in Case 2. That is, no comparison ($\overline{C}$), $J_k=1$, $\overline{S}_k=0$. We now wish to fetch the word located at the memory address specified by the IA field of the instruction and put it into the buffer whose J bit is 1. We must also gate the IA field of the instruction into the "where from" address portion of the same buffer. The J bit indication of 1 must also be stepped to the next buffer so that $J_k=0$ and $J_{k+1}=1$.

These steps of Case 2 are accomplished in the following manner. The A pulse, which was initiated either at the end of Case 1 by N′ as just described or by M′ as was described earlier in the discussion in conjunction with the loading of instruction register 206, performs the same gating function as it did in Case 1. However, this gating is not meaningful in Case 2 since neither $V_k$ nor $IA_k$ can be gated to adder 250 in the absence of $J_k \cdot \overline{S}_k$. The A′ pulse applied to AND gate 120 of FIGURE 2 will trigger the B–B′ pulse generator 122 since the $\overline{C}$ output from inverter 240 is "up" and, in addition, the $J \cdot S$ output of OR gate 290 is "up" because both inputs, and therefore the output of AND gate 288 are up.

The B pulse gates the IA field in instruction register 206 through a set of AND gates 294 to OR gates 204. OR gates 204 feed the left input of adder 250 (the right input is zero). The output of the adder is sampled at AND gates 260 by the B′ pulse and set into register 262. The B′ pulse is also applied to OR gate 104 (FIG. 2) and triggers the memory timer producing M and M′ pulses. The B′ pulse turns on trigger 601 (FIG. 4) which remembers that a memory fetch is being initiated for a new index word to be placed into one of the index buffers. The B′ pulse also sets the IA field of the instruction into the where from address of the buffer whose J bit is on. This is accomplished at a set of AND gates 296 whose three inputs are all up. $J_{k+1}$ is turned "on" by the B′ pulse applied to AND gate 298 whose other input is the "on" side of the $J_k$ bit. $J_k$ is turned "off" by B′ applied to AND gate 310 whose other input is also supplied by the "on" side of $J_k$. The M pulse applied to OR gate 273 sends the index address IA of the instruction from register 262 through AND gates 274 to the main memory.

The word from memory is continuously applied to the set of AND gates 300. These AND gates are conditioned by $J_{k+1}$ which is on due to the previous B′ pulse. Trigger 601 which is also "on" is another condition for AND gates 300. The output of AND gates 300 goes through OR gates 302 whose output is sampled by M′ applied via an OR gate 306 to AND gates 304 so that the memory word is entered into the $V_k$ portion of register 208. Also, at the end of the memory read cycle, the M′ pulse is applied to AND gate 108 whose other input comes from trigger 601. The output of AND gate 108 is applied to OR gate 106 which in turn triggers the A–A′ pulse generator. The M' pulse is fed through delay 616 to turn off trigger 601.

We have now reached a condition where a comparison between the IA field of the instruction register 206 and the "where from" address of buffer *k* exists. This is Case 3.

In Case 3 we wish to index the instruction. This is accomplished as follows. The A pulse which was initiated as described at the end of Case 2 performs no significant function in Case 3. The A' pulse, however, when applied to AND gate 126 will trigger the D–D' pulse generator 127 since we have a comparison from OR gate 238 in FIG. 3 and, therefore, a "compare" signal C on line 316. Signal C is applied through an OR gate 129 to AND gate 126. The D pulse allows the address portion of the instruction register to reach the adder by way of AND gates 200 and OR gates 204. The other input to the adder is supplied with data from the value section $V_k$ of buffer *k* (the buffer compared with). This is accomplished through AND gates 226 and OR gates 246 by the coincidence of signals D and $\overline{NI}$ at the inputs of an AND gate 225 whose output is applied via OR gate 244. The $\overline{NI}$ term indicates that indexing is to be performed and is derived from the op code or IA field of register 206 through decoder 227. The no indexing case NI will be described later. The output of the adder is gated into register 262 by D' applied to AND gate 260.

If the instruction is not of the index modification type, we now have the effective address in register 262. At this point, a comparison is made between the effective address in register 262 and the "where from" addresses $IA_k$, $IA_{k+1}$, etc. of the buffers in sets of EXCLUSIVE OR gates 266, there being a set for each buffer. When there is a comparison, with buffer *k* for example, the corresponding gates 266 are down but the corresponding inverter 268 provides a pulse $K_k$ to OR gate 269 whose output is compare signal K. When there are not any comparisons, none of the inputs to OR gate 269 is up and, therefore, there is no K signal produced, but inverter 271 supplies a non-comparison signal $\overline{K}$. There are four possible operations after the comparisons are made in gates 266.

I. If there is no comparison $\overline{K}$ (as indicated by the output from inverter 271) and if the instruction is not of the store type, the D' pulse applied to AND gate 109 will trigger the memory read timer 124. The no store ($\overline{\text{store}}$) and no index modification ($\overline{\text{index modification}}$) signals are derived from the instruction in register 206 and obtained from decoder 227. As shown in FIG. 4, the D' pulse will also turn "on" trigger 602 through AND gate 618. This trigger remembers that a fetch of an operand from main memory was initiated. The word from memory is sent to the operand buffer 256 by way of AND gates 707 which are conditioned by the "on" trigger 602 and gated by M'.

The M' pulse is also applied to AND gate 603 to send a "go" signal through OR gate 617 to execution controls 619, thereby indicating that the execution unit 620 should start processing the data in register 256. The M' pulse is also delayed and used to turn off trigger 602. When processing is completed, execution controls unit 619 sends a pulse 621 to OR gate 101 (FIG. 2) to step instruction counter 701 and fetch the next instruction.

II. If there is no comparison $\overline{K}$, and the instruction is of the store type, the D' pulse applied to AND gate 604 indicates that the execution unit should proceed and a "go" signal is sent to execution controls 619. In this case, the op code causes the execution unit to supply data to the register 256. The date is supplied by means of AND gate 605 which is gated by a "store op" signal from execution controls 619. AND gate 606 in like manner triggers the memory write timer 116 by way of OR gate 115. Trigger 607 is also turned "on" by AND gate 606. This trigger remembers that the storage of an operand has been initiated and is used to step the instruction after the store is completed. In this case, the N pulse gates the data and effective address to memory by means of AND gates 272 and 274, respectively. At the end of the store cycle, the N' pulse applied to AND gate 111 will step the instruction counter 701 and will start the fetch of the next instruction from memory. The N' pulse delayed turns off trigger 607.

III. If there is a comparison K indicated by OR gate 269 and the instruction is not a store ($\overline{\text{store}}$), the D' pulse at the end of the indexing or add time gates the value $V_k$ of the buffer (assuming buffer *k*), whose "where from" address compares with the effective address into register 256. This is accomplished by AND gates 708. D' at AND gate 604 would again indicate that the execution unit should start processing the data in register 256.

When the execution unit finishes processing, execution controls unit 619 sends a pulse 621 to OR gate 101 (FIG. 2) which steps the instruction counter 701 and initiates the fetch of the next instruction as is done at the end of operation I.

IV. If there is a comparison (assume with buffer *k*) and the instruction is a store, the starting of the execution unit and the gating of the data into register 256 is the same as in II. However, in this case AND gate 608 supplies a pulse to trigger X–X' pulse generator 128. The X pulse applied to AND gates 709 allows the data in register 256 to reach AND gates 304 where it is gated by X', applied to OR gate 306, into the value field ($V_k$) of the buffer (*k*) compared with. The X' pulse also energizes OR gate 101 which steps the instruction counter 701 and subsequently initiates the fetch of the next instruction from memory.

If the instruction is an index modification, the D' pulse at the end of the index time triggers the I–I' pulse generator 130 by means of AND gate 132.

The I pulse applied to AND gates 316 allows the data in register 262 to reach AND gates 304 where it is gated by I', applied to OR gate 306, into the value portion ($V_k$) of the buffer *k* whose "where from" address compares with the IA field of the instruction register. The I' pulse applied to OR gate 101 steps the instruction counter 701 and subsequently initiates the fetch of the next instruction.

If the instruction were initially decoded to be one which required no indexing NI, the first time the A' pulse was generated an index add cycle would be started by triggering the D–D' pulse generator 127 by AND gate 126 whose inputs are signal NI from OR gate 129 and timing pulse A'. The D pulse would gate the address portion of the instruction register 206 to the left side of the adder by way of AND gate 200 and OR gate 204. The right side of the adder would have zero input since $\overline{NI}$ being down would block D from opening AND gate 225 and, thereby, AND gate 226. D' gates the adder output into register 262. At this point, the contents of register 262 are compared in EXCLUSIVE OR gates 266 as previously described followed by the possible operations I–IV.

Adder 250 is assumed to be a parallel adder with no storage and may be of the single ripple carry design. Registers 256 and 262 need not be reset between the sampling or gating pulses since it is assumed that these registers have bi-polar inputs; i.e. when they are sampled, they are set to the state of the input. Even though this preferred embodiment has been described using parallel binary code operation, other codes and serial operation could be used without departing from the scope of this invention.

While there have been shown and described and pointed out the fundamental novel features of the invention as applied to the preferred embodiment, it will be understood that various omissions and substitutions and changes in the form and details of the system illustrated and in its operation may be made by those skilled in the art without departing from the spirit of the invention. It is the intention, therefore, to be limited only as indicated by the scope of the following claims.

What is claimed is:

1. A data processing system comprising means for storing a program instruction, said instruction including an operand address and an index address, memory means containing data stored at a plurality of memory locations, random access temporary storage means having plural sections each adapted to contain selected data and the memory address of said selected data, means for detecting a non-comparison between said index address and all of the memory addresses contained in said temporary storage means, means for determining the section of said temporary storage means containing the least recently acquired data, and means responsive to said non-comparison for storing in said section the data stored in said memory means at the location specified by said index address.

2. A data processing system as defined in claim 1 further comprising means indicating a non-comparison between the data in said section and the data stored in said memory means at the memory location in said section, and means responsive to said indicating means for storing the data in said section into said memory means at the memory location in said section.

3. A data processing system including a main memory and comprising means for storing a program instruction, said instruction including an operand address and an instruction index address, random access storage means containing index values and their main memory addresses, means for comparing said instruction index address with said index memory addresses, means responsive to a comparison between said instruction index address and one of said index memory addresses for selecting the index value associated with the compared index memory address, means responsive to a non-comparison between said instruction index address and all said memory addresses for transferring a new index value from said main memory at the location specified by said instruction index address to said random access storage means in place of the least recently acquired index value in said storage means, and means for selectively adding together and said new index value and the operand address of said instruction to obtain an effective address.

4. A data processing system as defined in claim 3 further comprising means to substitute said effective address for said selected index value in said random access storage means, and means to substitute said effective address for said new index value in said main memory.

5. A program instruction indexing system comprising an instruction register containing an instruction, said instruction including binary information bits representing an operand address and an index address, a main memory having operands and index values stored at a plurality of memory locations, a plurality of random access buffer registers each adapted to hold bits representing an index value and its main memory address, said index memory address indicating the address in memory from which said index value was acquired, means associated with each buffer register for indicating that a selected buffer contains the least recently acquired index value, means associated with said selected buffer for indicating a non-comparison between the selected buffer index value and the main memory index value stored at the location having an address which is the same as the index memory address in said selected buffer, means responsive to said non-comparison indicating means for storing said selected buffer index value in said memory location in place of said main memory index value, means for storing in said selected buffer a new index value derived from the location in said main memory at the address which is the same as the index address of said instruction, and means for adding together said new index value and said operand address to obtain an effective operand address.

6. A program instruction indexing system as defined in claim 5 further comprising second comparison means to compare said effective operand address with said index memory addresses stored in said buffer registers.

7. A program instruction indexing system as defined in claim 5 wherein each said buffer register further contains a first binary bit and a second binary bit, means for turning on the first binary bit of said selected buffer, and means for turning on the second binary bit of said selected index buffer when the index value contained therein is not the same as the value contained in main memory at the location specified by the index memory address of said selected buffer.

8. A program instruction indexing system comprising an instruction register adapted to contain an instruction, said instruction including binary information bits representing an operational code, an operand address and an index address, a main memory having stored therein binary information bits representing operands and index values located at a plurality of memory addresses, a plurality of buffer registers each adapted to contain binary information bits representing an index value, the index main memory address and also a first and second binary bit; comparison means for comparing the instruction index address with all the buffer index memory addresses, means responsive to said comparison means for producing a non-comparison signal when there are no comparisons and a comparison signal when there is a comparison with a buffer index memory address, first circuit means for turning on the first binary bit of the one buffer register holding the least recently acquired index value, second circuit means for turning on the second binary bit of a buffer register containing an index value different from the index value stored in said memory at the address which is the same as the index memory address in said buffer register, means responsive to said first and second binary bits being on and to said non-comparison signal for storing a modified index value in said one buffer register into said main memory at the memory address equal to the index memory address of said one buffer and for turning off said second binary bit, means for storing into said one buffer register the index value located in said memory at the memory address equal to said instruction index address and for turning off said first binary bit of said one buffer register and means responsive to said comparison signal from said comparison means for adding together said operand address and the index value in the buffer register having an index memory address which compares with said instruction index address, the result of said addition being an effective operand address.

9. A data procesing system comprising means for storing a program instruction, said instruction including an operand address and an index address, memory means containing data stored at a plurality of memory locations, random access temporary storage means having plural sections each adapted to contain selected data and the memory address of said selected data, means for detecting a non-comparison between said index address and all of the memory addresses contained in said temporary storage means, means for determining the section of said temporary storage means containing data having a predetermined previous history, and means responsive to a non-comparison for storing in said section the data stored in said memory means at the memory location specified by said index address.

10. A data processing system as defined in claim 9 further comprising means indicating a non-comparison between the data in said section and the data stored in said memory means at the memory location in said section, and means responsive to said indicating means for storing the data in said section into said memory means at the memory location in said section.

11. A data processing system including a main memory and comprising means for storing a program instruction, said instruction including an operand address and an instruction index address, random access storage means containing index values and their main memory addresses, means for comparing said instruction index address with said index memory addresses, means responsive to a comparison between said instruction index address and one of said index memory addresses for selecting the index value associated with the compared index memory address, means responsive to a non-comparison between said instruction index address and all said memory addresses for transferring a new index value from said main memory at the location specified by said instruction index address to said first storage means in place of the index value in said first storage means having a predetermined previous history of use, and means for selectively adding the selected index value and said new index value to the operand address of said instruction to obtain an effective address.

12. A data processing system as defined in claim 11 further comprising means to substitute said effective address for said selected index value in said random access storage means, and means to substitute said effective address for said new index value in said main memory.

13. A program instruction indexing system comprising an instruction register containing an instruction, said instruction including binary information bits representing an operand address and an index address, a main memory having operands and index values stored at a plurality of memory addresses, a plurality of random access buffer registers each adapted to hold bits representing an index value and the index main memory address, said index memory address indicating the address in memory from which said index value was acquired, means associated with each buffer register for indicating that a selected buffer contains an index value having a predetermined previous history of use, means associated with said selected buffer for indicating a non-comparison between the selected buffer index value and the main memory index value stored at the address which is the same as the index memory address in said selected buffer, means responsive to said non-comparison indicating means for storing said selected buffer index value in said memory in place of said main memory index value, means for storing in said selected buffer a new index value located in said main memory at the address which is the same as the index address of said instruction, and means for adding together said new index value and said operand address to obtain an effective operand address.

14. A program instruction indexing system as defined in claim 13 further comprising second comparison means to compare said effective operand address with said index memory addresses stored in said buffer registers.

15. A program instruction indexing system comprising a program instruction register adapted to contain an instruction, said instruction including binary information bits representing an operational code, an operand address and an index address, a main memory having stored therein binary information bits representing operands and index values located at a plurality of memory locations, a plurality of buffer registers each adapted to contain binary information bits representing an index value, the index main memory address and also a first and a second binary bit; comparison means for comparing the instruction index address with all the buffer index memory addresses, means responsive to said comparison means for producing a non-comparison signal when there are no comparisons and a comparison signal when there is a comparison with a buffer index memory address, first circuit means for turning on the first binary bit of the one buffer register holding an index value having a predetermined previous history of use, second circuit means for turning on the second binary bit of a modified buffer register containing an index value different from the index value stored in said memory at the location whose address is the same as the index memory address in said modified buffer register, means responsive to said first and second binary bits being on and to said non-comparison signal for storing a modified index value in said one buffer register into said mean memory location having an at the memory address equal to the index memory address of said one buffer and for turning off said second binary bit, means for storing into said one buffer register the index value located in said memory at the memory location having an address equal to said instruction index address and for turning off said first binary bit of said one buffer register and means responsive to said comparison signal from said comparison means for adding together said operand address and the index value in the buffer register having an index memory address which compares with said instruction index address, the result of said addition being an effective operand address.

16. A data processing system comprising: means for storing a program instruction, said instruction including an interim address; memory means containing data stored at a plurality of memory locations; random access temporary storage means having plural sections, each section containing interim address data and memory address data, where said data corresponds to at least portions of interim and memory addresses; comparison means responsive to the interim address data in all sections of the temporary storage means and to the corresponding address data in the instruction for providing an indication when no comparison is present; means for selecting a section of the temporary storage means having a predetermined previous history; and means responsive to a non-comparison indication for storing in said section, interim address data from the instruction and corresponding memory address data.

17. A data processing system comprising: means for storing a program instruction, said instruction including an interim address; memory means containing data stored at a plurality of memory locations; random access temporary storage means having plural sections, each section containing interim address data and memory address data, where said data corresponds to at least portions of interim and memory addresses; comparison means responsive to the interim address data in all sections of the temporary storage means and to the corresponding interim address data in the instruction storage means for providing an indication when no comparison is present; and means responsive to a non-comparison indication for storing in a section of the temporary storage means, having a predetermined previous history of use, interim address data from the instruction and corresponding memory address data.

18. A data processing system comprising: means for storing a program instruction, said instruction including an interim address; memory means containing data stored at a plurality of memory locations; random access temporary storage means having plural sections, each section containing interim address data and memory address data, where said data corresponds to at least portions of interim and memory addresses; comparison means responsive to the interim address data in all sections of the temporary storage means and to the corresponding address data in the instruction storage means for providing a first indication when a comparison is present and a second indication when no comparison is present; means responsive to a first indication for selecting the memory address data in the section providing the comparison is as to at least a portion of the memory address; and means responsive to a second indication for storing in a section of the temporary storage means, having a predetermined previous history of use, interim address data from the instruction and corresponding memory address data, and for selecting this memory address data as at least a portion of the memory address.

19. An information storage system comprising:

an addressable, relatively large capacity memory of relatively long access time;

an information storage means requiring relatively short information access time and having a relatively small number of storage locations:

means for requesting a desired unit of information from said storage system;

means responsive to said requesting means for interrogating said storage means to determine if said desired unit of information is stored therein;

means responsive to an indication that the desired unit of information is not in said storage means for writing the desired unit of information stored in said memory into a selected storage location in said storage means, and means responsive to an indication that the desired unit of information is in said storage means for obtaining said desired unit of information therefrom.

20. A system of the type described in claim 19 wherein said selected storage location is determined by the previous history of the system.

21. A system of the type described in claim 20 wherein said previous history is a previous history of use.

22. A system of the type described in claim 21 wherein the selected storage location is the one containing the information unit whose use for the first time in the storage means was the least recent.

23. A system of the type described in claim 19 wherein said selected storage location is selected in response to the status of the contents thereof.

24. A system of the type described in claim 23 including a status indicator associated with each storage location of said storage means;

and means responsive to a predetermined condition of the status indicator associated with a given storage location for designating the given storage location as said selected storage location.

25. A system of the type described in claim 23 including means for indicating individually whether the contents of each storage location of said storage means has been modified;

and means responsive to an indication from said indicating means that the contents of said selected storage location has been modified for causing said contents to be written into said memory in place of the corresponding unit of information stored therein.

26. A system of the type described in claim 23 wherein each storage location in said storage means contains an indication of the address in memory from which the unit of information in the storage location was derived;

wherein the requesting means applies to the system on indication of the address in memory at which the desired unit of information is stored;

and wherein said interrogating means includes means for comparing the indication from said requesting means against the indications in the storage locations of said storage means, means for generating a first output indication, when a match is found, showing the storage location containing the matching indication, and means for generating a second output indication when no match is found.

27. A system of the type described in claim 19 wherein said desired unit of information is an index value; and including means for applying an operand address to said system;

and means for adding said indexed value to said operand address to form an effective address.

28. A memory arrangement for a data processing system comprising: a main information store having a relatively large capacity for storing words of information for executing programs in said data processing system; means including main store address and information registers for providing access to words of information in said main store; a small capacity, fast-access memory providing rapid access to words of information stored therein, said small memory comprising a set of registers for storing words of information which are being accessed currently in the execution of programs in said data processing system; means coupled to said fast-access memory for accessing all words of information stored in said memory arrangement including memory address and information registers; and control means for said memory arrangement including means for selectively controlling displacements of individual words of information in said set of registers of said fast-access memory and replacing said displaced words in said set of registers by other words of information having addresses in said main store.

29. A memory arrangement for a data processing system comprising: a main information store having a relatively large capacity for storing words of information; means including main store address and information registers for accessing words of information in said main store; a small capacity, fast-access memory providing rapid access to words of information stored therein, said small memory comprising a plurality of sets of address and information storage registers for storing words of information which are currently being accessed and their respective addresses; means coupled to said fast-access memory for accessing all words of information stored in said memory arrangement including memory address and information registers; and control means for said memory arrangement including means for selectively controlling displacement of individual words of information in said sets of registers of said fast-access memory and replacing said displaced words in said sets of registers by other words of information currently being accessed and their respective addresses.

30. A memory arrangement for a digital data processing system comprising: a processing unit for processing digital information; a main store providing magnetic storage of words of information and random access thereto within the time period of an operating cycle of the main store including reading-out and writing-back a word of information being accessed from said main store; a small capacity, fast-access memory unit for storing a limited number of words of information and their addresses in multiple sets of address and information storage registers to provide random access to words stored therein for said processing unit within a shorter time period of a cycle of said memory unit; control circuit means coupled to said main store and memory unit for controlling the transfer of words of information between the main store and the memory unit; and alteration indicator means coupled to said memory unit and to said control circuit means, said indicator means being responsive to alteration of a word stored in the memory unit to provide an output to the control circuit means which enables said latter means to transfer altered words from the memory unit for storage in said main store.

References Cited

UNITED STATES PATENTS

| | | | |
|---|---|---|---|
| 2,796,218 | 6/1957 | Tootill et al. | 340—172.5 |
| 2,843,841 | 7/1958 | King et al. | 340—172.5 |
| 3,064,895 | 11/1962 | Heineck et al. | 340—172.5 |
| 3,231,868 | 1/1966 | Bloom et al. | 340—172.5 |

PAUL J. HENON, *Primary Examiner.*

J. P. VANDENBERG, *Assistant Examiner.*

UNITED STATES PATENT OFFICE

CERTIFICATE OF CORRECTION

Patent No. 3,427,592 February 11, 1969

Ralph J. Bahnsen et al.

It is certified that error appears in the above identified patent and that said Letters Patent are hereby corrected as shown below:

Column 4, line 50, "If logical block 40 determines that the instruction is" should read -- If block 35 determines that an index modification is to --. Column 5, line 70, "no" should read -- now --. Column 11, line 43, cancel "and", first occurrence. Column 14, line 3, "mean" should read -- main --.

Signed and sealed this 7th day of April 1970.

(SEAL)

Attest:

Edward M. Fletcher, Jr.

Attesting Officer

WILLIAM E. SCHUYLER, JR.

Commissioner of Patents